United States Patent Office 3,770,683
Patented Nov. 6, 1973

3,770,683
GRAFT COPOLYMERS OF POLY(VINYLPYRROL-IDONE) WITH ACRYLIC ACID AND ACRYLIC ESTER
Eugene S. Barabas, Watchung, and Marvin M. Fein, Westfield, N.J., assignors to GAF Corporation, New York, N.Y.
No Drawing. Continuation of abandoned application Ser. No. 25,255, Apr. 2, 1970. This application Feb. 14, 1972, Ser. No. 226,266
Int. Cl. C08f 19/00, 41/00
U.S. Cl. 260—29.6 RW          8 Claims

ABSTRACT OF THE DISCLOSURE

Grafted terpolymers of a polymeric N-vinyl lactam, such as polyvinyl pyrrolidone, with alkyl acrylates and acrylic acid units, are prepared as stable aqueous solutions.

This is a continuation of application Ser. No. 25,255, filed Apr. 2, 1970, and now abandoned.

BACKGROUND OF THE INVENTION

Field of the invention

The present invention relates to stable, aqueous emulsions comprising a grafted polymeric N-vinyl lactam containing an alkyl acrylate and an acrylic acid unit.

Description of the prior art

Grafted polymers comprising a basic homoploymer chain containing grafted thereon units, or a plurality of units, of one or more polymerizable monomers, represent an interesting and important development in the resin arts, particularly since such grafted polymers find immediate and practical utility for the resin chemist to utilized them as "building block" resin systems or "module" resin systems which can be employed to "tailormake" subsequent resin systems to suit specific industrial needs. Grafted copolymers can be made by a variety of polymerization methods including solution, emulsion or bulk polymerization. In the case of polymeric N-vinyl lactams, and particularly polyvinyl pyrrolidone, their use has been limited to a great extent to those fields of utility which take advantage of the inherent physical characteristics of polyvinyl pyrrolidone, the most important of which it its water solubility. While this physical characteristic of water solubility has projected polyvinyl pyrrolidone into a position of prominence for such industrial applications as pharmaceutical, cosmetic textile, lithographic uses, it conversely precluded its use in industrial applications where water-insolubility of the resin system is a prerequisite.

SUMMARY OF THE INVENTION

Accordingly, it is an object of this invention to provide water-insoluble compositions based on polymeric N-vinyl lactams.

Another object of this invention resides in the provision of stable aqueous emulsions of polymeric N-vinyl lactams.

Yet another object of this invention resides in the provision of stable aqueous emulsions comprising a polymeric N-vinyl lactam with grafted side chains containing alkyl acrylate and acrylic acid units.

Other objects and advantages of the invention will become apparent as the description of the invention proceeds.

In accordance with the above-defined objects, methods have been devised whereby stable aqueous emulsion lactices are provided comprising a polymeric N-vinyl lactam containing alkyl acrylate and acrylic acid units.

DESCRIPTION OF PREFERRED EMBODIMENTS

The terpolymer latices upon which the present discovery is based, find immediate and practical applicability for use as cast films which are transparent, colorless and flexible. The films which are deposited are strong and clear and can be produced directly upon evaporation at room temperatures and are therefore important in hairspray compositions. Thus such materials are eminently useful as protective coatings, impregnants and permanent sizing agents for paper, leather and the like. Still other useful applications of the emulsions of the invention include their use as pastes or dispersions in hot dip coating, slush casting and cellular elastomer applications.

In addition to their use as film, the acrylic acid units represent a functionality by which the resulting polymer of the invention can be subjected to various chemical reactions to yield a variety of products, the terpolymers thus being useful intermediates. Moreover, the polymer can be crosslinked through its functional groups by bifunctional compounds, by heat treatment or other procedures known in the art. By such treatments, solvent-resistant films, filaments and other materials can be prepared.

In formation of the foregoing products, the emulsions can be conveniently compounded with additives such as pigments, salts, wetting agents, waxes, etc., to provide specifically desired properties in a wide range of products.

The polymeric N-vinyl lactams utilized in the preparation of the compositions of this invention may be characterized by the following general structural formula:

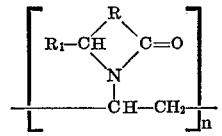

wherein R represents an alkylene bridge group of 2 to 4 carbon atoms necessary to complete a 5, 6 or 7-membered heterocyclic ring system, $R_1$ represents either hydrogen or an alkyl group, and $n$ represents a number which indicates the extent of polymerization.

All of the specific polymeric materials characterized by the foregoing general formula are commercially available and called polymeric N-vinyl lactams. They are obtained by polymerizing organic 5, 6 or 7-membered ring compounds containing in their rings the —NH—CO— group, such as, for example, N-vinyl-2-pyrrolidone, N-vinyl-5-methyl - 2-pyrrolidone, N-vinyl-2-piperidone, N-vinyl-ε-caprolactam, and the like. Depending upon the extent of polymerization, polymers having molecular weights ranging from at least 400 up to 2,000,000 or more may be produced. Viscosity measurements are commonly used as an indication of the average molecular weight of polymeric compositions, the instant polymers being characterized by a chain of carbon atoms to which the lactam rings are attached through their nitrogen atoms.

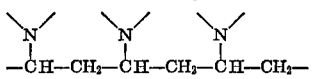

The K value (Fikentscher) of any particular mixture of polymers is calculated from viscosity data and is useful as an indication of the average molecular weight of such mixture. Its determination is fully described in "Modern Plastics," 23, No. 3, 157–61, 212, 214, 2.6, 218 (1945), and is defined as 1000 times $k$ in the empirical relative viscosity equation:

$$\frac{\log_{10} \eta_{rel.}}{c} = \frac{75k^3}{1+1.5kc} + k$$

wherein C is the concentration in grams per hundred cc. of polymer solution and $\eta_{rel.}$ is the ratio of the viscosity of the solution to that of pure solvent. The K values are reported as 1000 times the calculated viscosity coefficient in order to avoid the use of decimals. For the purpose of the present invention, there may be employed those polymeric N-vinyl lactams having a K value of about 10 to 200, preferably of 30 to 100 because of their viscosity at lower concentrations.

K values and specific viscosities ($\eta_{sp.}$) are interconvertible and are related through relative viscosity ($\eta_{rel.}$). Thus, when viscosity measurements are taken on solutions which have a concentration of 1.00 gram of polymer per deciliter of solution at 25° C. (c.=1), the relationships are as follows:

$$\eta_{rel.} = \eta_{sp.} + 1$$

Relative viscosity=specific viscosity plus one.
Relative viscosity $$= 10[0.001K + 0.000075K^2/(1+.0015K)]$$

Hence, $\eta_{sp.}$ $$= -1 + 10[0.001K + 0.000075K^2/(1+0.0015K)]$$

Relative viscosity, specific viscosity and K are dimensionless, whereas inherent viscosity $$\frac{(\log_e \eta_{rel.})}{C}$$

and intrinsic viscosity (the limit of inherent viscosity as C approaches zero) have the dimensions of dilution, i.e., the reciprocal of concentration. Intrinsic viscosity and K are intended to be independent of concentration.

The number of recurring polymer units enclosed by brackets in the foregoing general structural formula, indicated by $n$, or the extent of degree of polymerization, corresponds to a chain of roughly 4 to 20,000 monomer units or more. In actual practice, a mixture of polymeric molecules, each containing a different number ($n$) of monomer units, is always produced. The polymers are well known in the art and are readily prepared for example by the procedural steps given in U.S. Pats. 2,265,450; 2,317,804; and 2,335,454 and in which working examples of the species characterized by the above formula are given and the preparation of which are incorporated herein by reference.

The alkyl acrylates which are employed in the invention are those alkyl esters of acrylic acid and methacrylic acid wherein the alkyl portion contains about one to about twelve carbon atoms. The alkyl chain may be straight- or branch-chained. Particularly preferred compounds falling within this class are ethyl acrylate, methyl methacrylate, n-propyl acrylate, n-butyl acrylate, 2-ethylhexyl acrylate, lauryl acrylate and the like with ethyl acrylate being especially preferred because of its readily availability and the properties of the products produced therefrom. Mixtures of these acrylates may also be employed. These compounds are well known to the art.

The acrylic acid units of the products of the invention are obtained by use of an alpha, beta-unsaturated acid reactant of the formula:

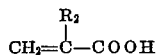

wherein $R_2$ is hydrogen or an alkyl group of 1 to about 7 carbon atoms. Illustrative of such compounds are acrylic acid and methacrylic acid as well as those acids where $R_2$ is an alkyl group of 2 to 7 carbon atoms. These compounds and their methods of preparation are well known in the art. Acrylic acid and methacrylic acid are especially preferred reactants of this class because of their ready availability and excellent properties of the products obtained therefrom.

While not wishing to be bound by any particular theory or mechanism of reaction, it is believed that the arrangement of the monomeric units, that is, the alkyl acrylate and acrylic acid units, is an essential part of the invention in relation to the polymeric N-vinyl lactam. With respect to the terpolymers of the present invention, the units of alkyl acrylate and acrylic acid are not situated in the main polymer chain but rather they form a more or less alternating side chain on the preformed polyvinyl pyrrolidone which forms the skeletal chain for the addition of the alkylacrylate and acrylic acid units. Thus the polymers may be characterized as graft terpolymers.

The ratio (by weight) of the polymeric N-vinyl lactam and the comonomers can generally range from about 10:90 to about 99:1. The ratio of alkyl acrylate and acrylic acid units may range from about 80:20 to 99:1 by weight, respectively. In a most preferred embodiment, the products contain not more than about 60% polymeric N-vinyl lactam and at least 40% of the mixed alkyl acrylate/acrylic acid monomers, i.e., a ratio of 60:40, since too large amounts of the lactam increase the brittleness of the product, and where the amount of alkyl acrylate to acrylic acid ranges from 90:10 to about 99.5:0.5. Also, preferred products are those containing about 1 to 5 percent by weight of acrylic acid units based on the total amount of polymer.

For the preparation of the emulsions of this invention, the polymerizations are carried out in aqueous dispersion, in the presence preferably about 1 to 10% by weight of a water-soluble polymerization initiator such as potassium persulfate, ammonium persulfate, similar initiators or other known free radicals, or by use of high energy radiation (X-rays, gamma-rays) and advantageously also in the presence of a surface-active agent. The preferred practice is to first prepare an aqueous solution containing the polymeric vinyl lactam, the initiator and the surface active agent, heat the solution to the desired temperature and then add the monomers in admixture gradually to the reaction mixture, or add separately gradually and at such rate that the respective monomers are completely added at the end of any stated time period. The reaction is preferably carried out in the absence of free oxygen and most preferably under a blanket of neutral gas (e.g. nitrogen, argon, etc.). After completion of the addition of all of the monomers, the reaction mixture is then heated for a period up to several hours or more. Preferred reaction temperatures range from 50–100° C. and most preferably from 85–100° C. to avoid violent reaction and undesirable side reactions. The resulting stable aqueous emulsion contains the resinous interpolymers, above-defined, in the form of small particles or beads measuring in diameter about from 100 to 300 millimicrons.

If desired, an activating agent such as an alkali metal sulfite or bisulfite, e.g., sodium, potassium, etc., sulfites and metabisulfites can be added to the polymerization reaction mixture in about the same amount as the polymerization initiator in which case lower polymerization temperatures may be used. Chain regulators such as hexyl, cetyl, dodecyl, myristyl, etc., mercaptans can also be employed in the polymerizations.

Suitable surface-active agents include fatty acid soaps, fatty alcohol sulfates such as sodium lauryl sulfates, potassium lauryl sulfate, etc., alkali metal salts of aromatic sulfonic acids, e.g., sodium isobutylnaphthalene sulfonate, etc., phosphate esters of polyethoxy alkylphenols, sulfosuccinic esters, γ-stearaminopropyl, dimethyl-β-hydroxyethyl ammonium chloride, and the like.

As indicated above, the emulsions can be compounded with additives such as pigments, salts, wetting agents, resins, waxes and the like, thus providing a wide spectrum of products having wide industrial application.

It has also been found that stable emulsions of the class described above can be prepared without the use of emulsifying agents or protective colloids, although it has been observed that it is preferable to add such materials to the emulsion recipe in order to obtain high conversions and greater stability of the resultant emulsions.

The following examples will serve to illustrate the practice of the invention.

EXAMPLE I

Distilled water, 431 grams, is placed in a resin kettle equipped with mechanical stirrer, reflux condenser, thermometer and gas inlet tube. Poly (vinyl pyrrolidone), 115.4 grams, and 240 grams of a 10% solution of sodium lauryl sulfate surfactant are added, and the mixture is stirred until a clear solution is obtained. The system is then purged well with nitrogen gas and heating is started. At 60° C., 16 grams of a 10% ammonium persulfate solution is added and the temperature is raised to 100° C. This temperature is held for 30 minutes, then the mixture is cooled to 92° C. At this temperature the addition of a mixture of 263.4 grams of ethylacrylate and 5.4 grams of acrylic acid (1.4% acrylic acid based on total amount of polymer) is started. The addition takes place in 3 hours. At this point 1 gram of 1% ammonium persulfate is added. The addition of the catalyst is repeated every 2 hours until the amount of the unreacted monomers is below 0.1%. Finally the pH of the product is adjusted to 6.0 by the addition of concentrated ammonium hydroxide solution.

Analysis of resulting solution:
  Solids: 35.2%
  Residual monomer: Nil
  Conversion: 100%
  K-value: 107.6 (in DMF)
  Brookfield viscosity: 50.2 cps.
  pH (as is): 2.1

EXAMPLE II

The course of the reaction is similar to the one described in Example I. The ingredients of the polymerization are as follows:

|  | Grams |
| --- | --- |
| Distilled water | 1681.0 |
| Polyvinyl pyrrolidone (K–30) | 449.3 |
| Surfactant (10% solution of potassium lauryl sulfate) | 936.0 |
| Ethyl acrylate | 988.3 |
| Acrylic acid (4% acrylic acid based on total amount of polymer) | 60.0 |
| Ammonium persulfate (5% solution) | 62.4 |

Analysis of the resulting solution:
  Solids: 32.78%
  Residual monomer: Nil
  Conversion: 100%
  K-value: 60.5 (in absolute ethanol)
  Brookfield viscosity: 29.0 cps.
  pH (as is): 2.1

It will be apparent that in place of the polyvinyl pyrrolidone having a potential K value of 30 employed in the foregoing examples, other polymeric N-vinyl lactams or polyvinyl pyrrolidones having other degrees of polymerization may be employed in practicing the present invention. We particularly prefer the commercially available polymers of N-vinyl-2-pyrrolidone having potential K values of from about K15 to K90 which corresponds to average molecular weights as determined by osmometric method (H. P. Frank and G. B. Levy, J. Polymer Sci. 10.371 (1953) from about 10,000 in the case of PVP K15 to about 360,000 in the case of PVP K90, PVP K30 having an average molecular weight of about 40,000 and PVP K60 having an average molecular weight of about 160,000.

Reference in the specification and claims to parts, proportions and percentages, unless otherwise specified, refer to parts, proportions and percentages by weight.

Since it is obvious that numerous obvious changes and modifications can be made in the above-described details without departing from the spirit and nature of the invention, it is to be understood that all such changes and modifications are included within the scope of the invention.

What is claimed is:

1. A stable aqueous emulsion comprising a carboxyl containing graft terpolymer having as the main chain a polymeric N-vinyl lactam of the formula:

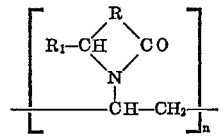

wherein R represents an alkylene bridge group containing from 2 through 4 carbon atoms, $R_1$ represents a member of the group consisting of hydrogen and alkyl and $n$ represents a positive integer representing the degree of polymerization and having grafted thereon as side chain units, an ester of acrylic acid or methacrylic acid wherein the alkyl group of the ester portion contains from 1 to about 12 carbon atoms, and an alpha, beta-unsaturated acid unit of the formula:

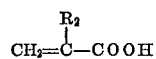

wherein R is hydrogen or an alkyl group of 1 to about 7 carbon atoms, and wherein the ratio by weight of polymeric N-vinyl lactam to said side chain units is about 10:90 to 60:40 and the ratio by weight of said ester to said acid is about 90:10 to 99.5:0.5.

2. An emulsion according to claim 1 wherein the polymeric N-vinyl lactam has a K value ranging from about 15 to about 90.

3. An emulsion according to claim 1 wherein mixtures of alkyl esters of acrylic acid or methacrylic acid are employed.

4. An emulsion according to claim 2 wherein the alkyl esters are selected from the group consisting of ethyl acrylate, ethyl methacrylate, butyl acrylate, 2-ethylhexyl acrylate and mixtures thereof.

5. An emulsion according to claim 4 wherein the polymeric N-vinyl lactam is polyvinylpyrrolidone.

6. An emulsion according to claim 5 wherein the alkyl ester reactant is ethyl acrylate.

7. An emulsion according to claim 6 wherein the alkyl ester reactant is acrylic acid.

8. The emulsions of claim 7 wherein the polymer contains approximately equal parts by weight of polyvinylpyrrolidone and ethyl acrylate by weight of the total product, with acrylic acid making up about 1 to 6% by weight of the total polymer.

No references cited.

MELVIN GOLDSTEIN, Primary Examiner

U.S. Cl. X.R.
260—885